US009722998B1

(12) United States Patent
Podemsky

(10) Patent No.: US 9,722,998 B1
(45) Date of Patent: Aug. 1, 2017

(54) AUTHENTICATING A COOKIE WITH DISTINCTIVE SIGNALS

(71) Applicant: LinkedIn Corporation, Mountain View, CA (US)

(72) Inventor: Yoav Podemsky, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 84 days.

(21) Appl. No.: 14/807,669

(22) Filed: Jul. 23, 2015

(51) Int. Cl.
*H04L 29/06* (2006.01)
*H04L 29/08* (2006.01)

(52) U.S. Cl.
CPC ........ *H04L 63/083* (2013.01); *H04L 67/1095* (2013.01)

(58) Field of Classification Search
CPC .......................... H04L 63/083; H04L 67/1095
See application file for complete search history.

(56) References Cited

U.S. PATENT DOCUMENTS

| 2007/0234409 | A1* | 10/2007 | Eisen | H04L 63/0876 726/6 |
| 2014/0344927 | A1* | 11/2014 | Turgeman | H04W 12/06 726/22 |
| 2015/0373015 | A1* | 12/2015 | Mary | H04L 63/0853 726/9 |

* cited by examiner

Primary Examiner — Noura Zoubair
(74) Attorney, Agent, or Firm — Park, Vaughan, Fleming & Dowler LLP

(57) ABSTRACT

A system, method, and apparatus are provided for using distinctive signals associated with an electronic device to authenticate or validate a cookie or other identifier issued to the device from a website or other source. When the device receives content (e.g., a web page) from the source, it also receives code for collecting the signals, which is executed when the content is rendered. The device transmits the signals to the source or other specified destination, where they may be processed (e.g., hashed) and retained. Upon subsequent access to content from the source, signals are again collected, transmitted to the source, and compared with those that were previously retained. If the current signals do not match the retained signals, the current device may be spoofing the valid/original device, and the source may take appropriate action (e.g., prevent some activity, require further authentication). Matching may be performed online and/or offline.

20 Claims, 4 Drawing Sheets

AUTHENTICATING A COOKIE WITH DISTINCTIVE SIGNALS

BACKGROUND

This disclosure relates to the field of computers. More particularly, a system, method, and apparatus are provided for verifying the authenticity or validity of a cookie or other unique identifier, to ensure it is being used by the same device or user to which it was issued.

Cookies (e.g., web cookies, browser cookies, Internet cookies) are data delivered to a user's browser from a website when the browser is navigated to that website, and usually comprise randomly generated text. After the cookie is stored by the browser, when the browser is again navigated to the same website it transmits the cookie to the website, thereby allowing the website to know that the browser and the device that incorporates the browser have previously visited the site.

Usually, the cookie also contains state information and/or some indication of the user's activity within the website so that the website can differentiate between users. Some specific types of cookies provide or enable unique functions, such as authentication cookies that indicate whether or not the associated user is logged into a website or service, and session cookies that identify users during sessions of activity with a website. Many websites rely on cookies to uniquely identify users and/or individual user sessions.

However, many cookies are vulnerable to theft, copying, or spoofing. For example, after a valid user logs in to a website that sends the user an authentication cookie, that cookie could be intercepted or copied and then used by another user on another computing device. When the other user navigates his or her browser to the same website, the browser will produce the cookie and the website may treat the other user as the valid user.

DETAILED DESCRIPTION

Figure 1:
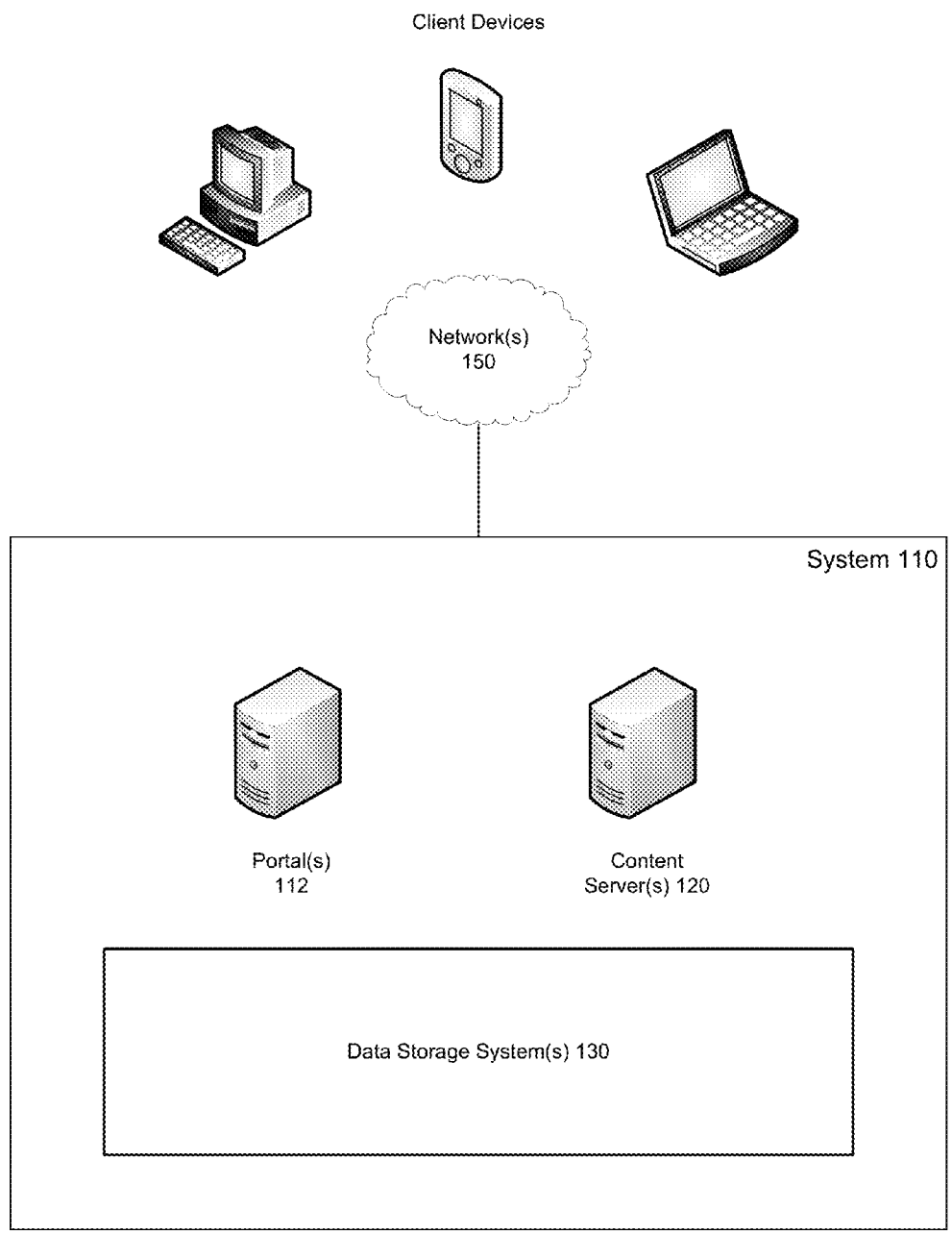
FIG. 1 is a block diagram depicting a computing environment in which distinctive signals regarding a particular computing device are used to authenticate or validate a cookie or other unique identifier, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for using distinctive signals regarding a computing/communication device to authenticate a cookie or other identifier issued to the user or device, or to verify the identity of the user or device. A typical identifier, such as an authentication cookie or a session cookie, contains little or no information that ties the identifier to the specific computing device on which it is stored or to which it was issued. Because of this, the identifier can easily be spoofed or copied by another user onto another device, and a website that issued the identifier to a particular device or user will accept it and treat the offending device or user as authentic.

In these embodiments, however, distinctive signals or characteristics of a particular device (and/or of a user/operator of the device) are collected and tied to an identifier issued to the device by a website or other source (e.g., during an initial visit or session). In some implementations, the signals may be used to generate the identifier (e.g., through hashing or other method of combination), or may be used to digitally sign the identifier.

Subsequently (e.g., during a later session when the identifier is returned to the website), the same signals are collected and compared with the original signals. This matching may be performed locally (e.g., at the device) and/or remotely (e.g., at the website or other source). If they match, the identifier may be accepted as valid, but if the signals do not match, the identifier may not be trusted and corrective action may be taken if warranted.

Matching and/or corrective action may be performed in real-time or near real-time (e.g., when the subsequent session is initiated or when the user attempts to take some action), or may be performed later or off-line. For example, if a mismatch is found between a set of original signals collected from a device during one session and a set of signals received in association with a later session, no action may be taken until the current/invalid user attempts to initiate activity that may be sensitive or until it is determined that the invalid user attempted (or succeeded) in performing some activity. Thus, if the invalid user or device simply views a user profile or accesses some shared information, no action may be taken to proactively block such activity, but if the invalid user attempts to change a password, send a message to another user, or take some other action that may impinge upon the valid user's privacy or security, the activity may be blocked.

Some embodiments may be described as verifying one or more aspects of an electronic device, rather than authenticating a cookie or other identifier issued to the device. For example, because information identifying the type/version of an operating system, a browser, and/or some other software application, plug-in, or module may also be exchanged between the device and a website, these embodiments may be considered to provide for verification of that information.

A mismatch between a first set of distinctive signals (e.g., a set retained in conjunction with issuance of a cookie by a content source) and a second set (e.g., a set obtained when the cookie is proffered to the content source) may indicate that the device from which the second set of signals was obtained is spoofing the device that provided the first set, is a bot attempting to scrape the content source, or that some other malicious actor is attempting to manipulate or damage the content source. Although specific embodiments are described as they may be implemented with a cookie, it should be understood that these embodiments may implemented with other types of local identifiers that may not normally be considered 'cookies.'

FIG. 1 is a block diagram depicting a computing environment in which distinctive signals regarding a particular computing device are used to authenticate or validate a cookie and/or a device to which a cookie is issued, according to some embodiments.

System 110 of FIG. 1 is (or is part of) a data center that serves content to users, including web pages. For example, the data center may host a network of users, such as a professional network offered by LinkedIn® Corporation, or may host some other service or application enjoyed by many users. Users of system 110 may be termed members because they may be required to register with the system in order to use features, applications, and/or services of system 110. By way of illustration, the system offers to members content specifically requested by the members and/or content that the system determines may be of interest to them.

Users/members of applications and/or services hosted by system 110 connect to the system via client devices, which may include stationary (e.g., desktop computer, workstation) and/or mobile devices (e.g., smart phone, tablet computer, laptop computer). In order to interact with the system (e.g., to view content, to submit or edit content) the client devices operate suitable client applications, such as a browser program or an application designed specifically to access system 110.

Client devices are coupled to system 110 via direct channels and/or one or more networks 150 or other shared channels, which may include the Internet, intranets, and/or other networks, and may incorporate wired and/or wireless communication links.

Interactive user/member sessions with system 110 are generally made through a portal 112, which may comprise a portal server, a web server, an application server, and/or some other gateway or entry point. The portal through which a given session is established may depend on the member's device and/or method of connection. For example, a user of a mobile client device may connect to system 110 via a different portal (or set of portals) than a user of a desktop or workstation computer.

System 110 also includes one or more content servers 120, and data storage system 130. Any component of system 110 may alternatively be implemented as or termed a service, a platform, or some other type of entity.

Content server 120 maintains one or more repositories of content items for serving to members, within data storage system 130 and/or elsewhere (e.g., one or more dedicated content repositories), an index of the content items, and/or other information useful in serving content to members. Illustratively, a content server may serve on the order of hundreds of millions of content items or objects every day. A content store may include various types of sponsored and/or unsponsored content items for serving to members and/or for use by various components of system 110, which may be generated within the system (e.g., by members) and/or by external entities.

A content server 120 (or some other component of system 110) serves content for presentation to users via their devices. Content served to a given user may include content the user specifically requests (e.g., by navigating to particular pages containing certain content) and/or content selected for presentation to the user (e.g., based on his or her activity, interests, friends, associates). A content server therefore may include a recommendation module for recommending specific content to serve to a particular user, or a recommendation module may be implemented separate from content server(s) 120.

Users of system 110 may have corresponding "identity" or "home" pages on the system (e.g., web pages, content pages), which they may use to facilitate their activities with the system and with each other, to view content, to form connections/relationships with other members, to view their connections and/or information regarding their connections, to review/modify profiles, to inform friends and/or colleagues of developments in their lives/careers, to send/receive communications, etc. These pages (or information provided to members via these pages) are available to some or all other members. Members' identity pages may be stored within data storage system 130 or elsewhere.

Data storage system 130, which may be a distributed data storage system, and/or components of the data storage system (e.g., separate storage engines), include appropriate data storage devices (e.g., disks, solid-state drives), and store data used by portal(s) 112, content server(s) 120, and/or other components of system 110 not depicted in FIG. 1.

In association with establishing communication sessions with users, and serving content to them, system 110 collects various signals from the users' devices and/or the user's themselves, as discussed further below. In some embodiments, these signals or representations of the signals (e.g., hashes or digests) are stored in data storage system 130 and/or elsewhere (e.g., portal(s) 112, content server(s) 120, a separate server). At least some content pages served to users (e.g., their identity or home pages) include code that, when executed by the users' browsers or other applications, cause their devices to return the desired signals. This code may also reside within data storage system 130, portal(s) 112, content server(s) 120, and/or elsewhere.

System 110 may include other components not illustrated in FIG. 1. For example, the system may include one or more profile servers for maintaining profiles of users/members of the services and applications hosted by system 110; the profiles may be stored in data storage system 130 and/or elsewhere (e.g., a dedicated profile repository). An individual member's profile may include or reflect any number of attributes or characteristics of the member, including personal (e.g., gender, age or age range, interests, hobbies, member ID), professional (e.g., employment status, job title, job location, employer or associated organization, industry, functional area or role, skills, endorsements, professional awards, seniority), social (e.g., organizations the user is a member of, geographic area of residence, friends), educational (e.g., degree(s), university attended, other training), etc. A member's profile, or attributes or dimensions of a member's profile, may be used in various ways by system components (e.g., to identify or characterize the member, to characterize a member connection that involves the member, to characterize content with which the member interacts, to identify content topics/items that may interest the member, to select content to serve to the member, to record a content event).

Organizations may also be members of the service(s) offered by system 110 (i.e., in addition to individuals), and may have associated descriptions or profiles comprising attributes such as industry, size, location, goal or purpose, etc. An organization may be a company, a corporation, a partnership, a firm, a government agency or entity, a not-for-profit entity, a group or collection of associated members, or some other entity formed for virtually any purpose (e.g., professional, social, educational). Either or both organizations and individual members may "follow" and/or be followed by other members, may share and/or received shared information, may initiate and receive communications with other members, may post content and/or receive content posted by other members, may form connections with other members, etc.

As another example, system 110 may include one or more tracking servers for monitoring and recording, within data storage system 130 and/or elsewhere (e.g., one or more tracking/activity repositories), activity of system 110 and/or members of the system's user community. For example, whenever content is served by the system (e.g., to a client device operated by a user/member), the tracking server may be informed of that content that is served, to whom (e.g., which member), when it was served, and/or other information. Similarly, the tracking server may also record member actions regarding content, to include identities of the members and the content acted upon, the action that was taken, when the action was taken, how long the interaction lasted, follow-on activity (if any), whether a current set of signals received from a device match previously stored signals, etc.

As yet another example, system 110 may include one or more connection servers for recording and maintaining users/members' connections with other members, within data storage system 130 and/or elsewhere (e.g., a dedicated repository of connection data). Such connections may be stored as a graph, for example, in which different nodes represent different members and a link between two given nodes represents a connection, which may be explicit or implicit.

In some embodiments, an explicit connection is formed when two members establish a formal connection (e.g., one of them accepts a connection request issued by the other); an implicit (or inferred) connection is formed automatically when one member takes some action or actions that involve another member and/or content associated with that other member (e.g., sends a communication, follows or subscribes to the other member, comments on a post or other content authored by the other user).

Functionality attributed herein to system 110 may be distributed among its components in an alternative manner, such as by merging or further dividing functions of one or more components, or may be distributed among a different collection of components. Yet further, while depicted as separate and individual hardware components (e.g., computer servers) in FIG. 1, one or more of portal(s) 112 and content server(s) 120 may alternatively be implemented as separate software modules executing on one or more computer servers. Thus, although only a single instance of a particular component of system 110 may be illustrated in FIG. 1, it should be understood that multiple instances of some or all components may be utilized.

In some embodiments, signals collected from a device for the purpose of validating or authenticating a cookie include one or more of: screen resolution, screen size, plug-ins, time zone, cpu (e.g., type of central processing unit), accelerometer (e.g., whether the device has an accelerometer, type of accelerometer), software versions of one or more programs residing on the device (e.g., the browser, Java™, Adobe Flash™, the operating system), keyboard (e.g., existence of a keyboard, type of keyboard), microphone (e.g., existence of a microphone, type of microphone), camera (e.g., existence of a camera, type of camera), clock skew (e.g., if constant), fonts, page loading time (e.g., for a predetermined page), execution time of a calculation or operation (e.g., calculate some quantity of prime numbers), touch screen (e.g., existence of a touch screen, type of touch screen), multi-touch screen (e.g., existence of a multi-touch screen, type of multi-touch screen), cache storage (e.g., the type/amount of cache storage), user agent, a canvas fingerprint (e.g., a canvas fingerprint created with the HTML5 canvas element), and an evercookie (e.g., existence of an evercookie, configuration of an evercookie).

The signals used to validate or authenticate a cookie may also (or instead) include signals that depend on or that involve user activity: a pattern of input device movements (e.g., on a mouse) made by a user when viewing some content or when clicking on a particular control within a web page; some characteristic of use of a keyboard (e.g., pattern of key clicks, (average) speed of key presses), such as when entering text into an input field of a web page; and whether the user has set a Do Not Track flag.

As one of skill in the art will understand, some of these signals are more accurate than others. The more accurate a signal, the more variation that may be seen in the signal between different devices, and therefore the better it is for distinguishing between different devices and/or users. Different signals may also vary as to their stability (or reliability) and privacy. The stability or reliability of a signal may indicate how likely the signal is to change, while the privacy of a signal may indicate whether it can be collected with or without endangering a user's privacy.

Thus, for a signal such as "fonts" (e.g., default or current fonts in one or more applications or documents on the device), accuracy may be relatively high because many fonts exist and different users tend to select different font mixes and characteristics (e.g., size, thin, wide). However, privacy and stability may be relatively low because a user's fonts may be very specific to him or her and because the user can easily (and frequently) change his or her fonts.

In contrast, for a signal such as "cpu" (e.g., a type of processor in the device), accuracy may be relatively low because a given type of cpu may be installed in a vast number of different devices. Privacy and stability, however, may be relatively high because identifying the cpu of a user's device does not threaten the user's privacy, and a given device's cpu rarely changes.

Figure 2:
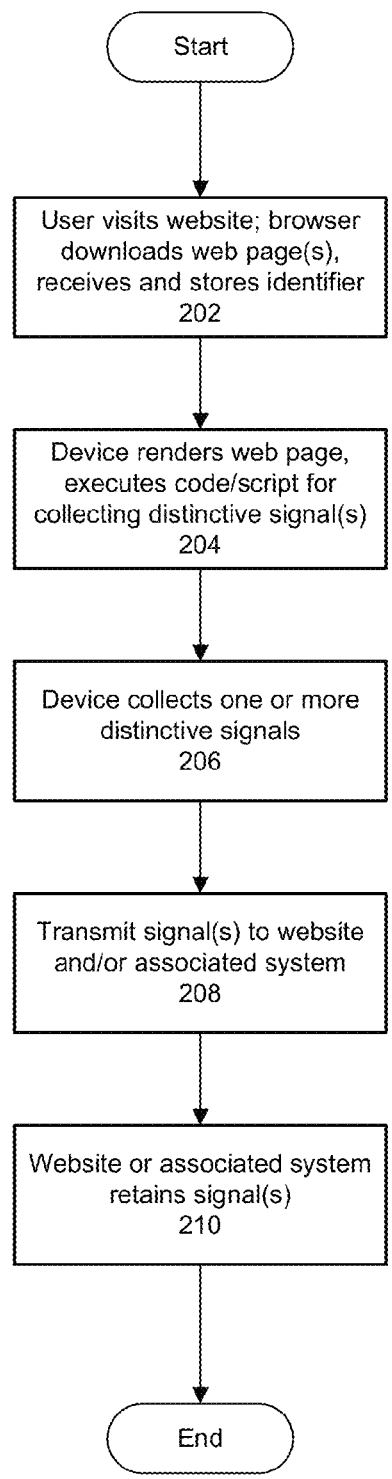
FIG. 2 is a flow chart illustrating a method of gathering distinctive signals regarding a particular computing device, to enable authentication or validation of a cookie or other unique identifier, in accordance with some embodiments.

FIG. 2 is a flow chart demonstrating a method of gathering distinctive signals regarding a particular computing device, to enable authentication or validation of a cookie (or other identifier) and/or a device to which a cookie (or other identifier) is issued, according to some embodiments. In other embodiments, one or more of the illustrated operations may be omitted, repeated, and/or performed in a different order. Accordingly, the specific arrangement of steps shown in FIG. 2 should not be construed as limiting the scope of the embodiments.

In operation 202, a user navigates a browser (or similar application) operating on his or her electronic device to access a particular website, and the browser downloads components of one or more web pages, such as a home page or a landing page. Also, the browser receives a cookie issued by the website, which is stored on the device. In these embodiments, operation 202 involves the first visit to the website by the device, or the first visit since the expiration or deletion of a previous cookie issued to the device by the website, or a new cookie may be issued to the device for some other reason.

Within the website, any number of content pages may be (or may have been) altered to include code for collecting distinctive signals on/from a device to which the pages are delivered for rendering or presentation. Illustratively, the code may be injected into static pages at any time, and/or separate versions of a given static page may be stored by the website—such as one version with the signal-collection code and one version without the code—with the appropriate version being served based on pertinent factors (e.g., destination device or address, destination user, a cookie issued to the device or received from the device). Similarly, dynamic pages may be assembled and served with or without the code, as appropriate.

In operation 204, the device (e.g., the browser) renders a web page received from the website. Also, the device executes the code (e.g., Javascript™) for capturing one or more distinctive signals from the electronic device, which was received as part of (or along with) the page.

In operation 206, the device (e.g., the browser) collects the specified signals, which may involve reading from one or more (software and/or hardware) configuration files or information files, identifying one or more components of the device and/or drivers for the components, determining whether or not the device includes a particular component, determining a time zone set on the device (e.g., as part of the operating system), etc.

The specific signals that are collected may or may not be predetermined. For example, the code or script may be configured to collect one or more specified signals, or may be configured to collect a certain number of signals (or as many signals as possible) within a set of specified signals. Or, the code or script may be configured with a list of potential signals, and the first X signals that are available on the device (X≥1) may be gathered. Yet further, dynamic decisions may be made regarding which signals to collect, based on the type of device, the website, the web page being rendered, and/or other factors.

In operation 208, the collected signal(s) is or are transmitted to the website or other specified location (e.g., a computer system that supports the website), and/or are stored on the electronic device. Because data stored on the user's device can be relatively easily faked, altered, or copied, it may be more secure to only store the signals on the website or a system associated with the website. Thus, while authentication or validation of a cookie may be performed locally (e.g., on the electronic device) or remotely (e.g., at the website), security concerns may cause a preference for the latter. In different embodiments, the signals may be transmitted toward the website in the clear, in encrypted form, hashed, as a digest, or in some other form.

In operation 210, the website or an associated system receives and stores the distinctive signals from the device, and may also receive the cookie assigned to the device if, for example, the cookie is not already available at the same system/site component that will retain the signals. The signals may be retained in a raw form (e.g., as text) or may be compressed, hashed, encrypted, or otherwise processed.

Thus, in the illustrated embodiments, a set of signals reflecting configuration of an electronic device is obtained and stored in association with a cookie issued to the device, an identifier of the device (e.g., an IP address), and/or an identifier of the user. Because some signals may not exist, or may not be as accurate as others on a particular device, the signals that are collected may depend on various factors, including those identified above.

Figure 3:
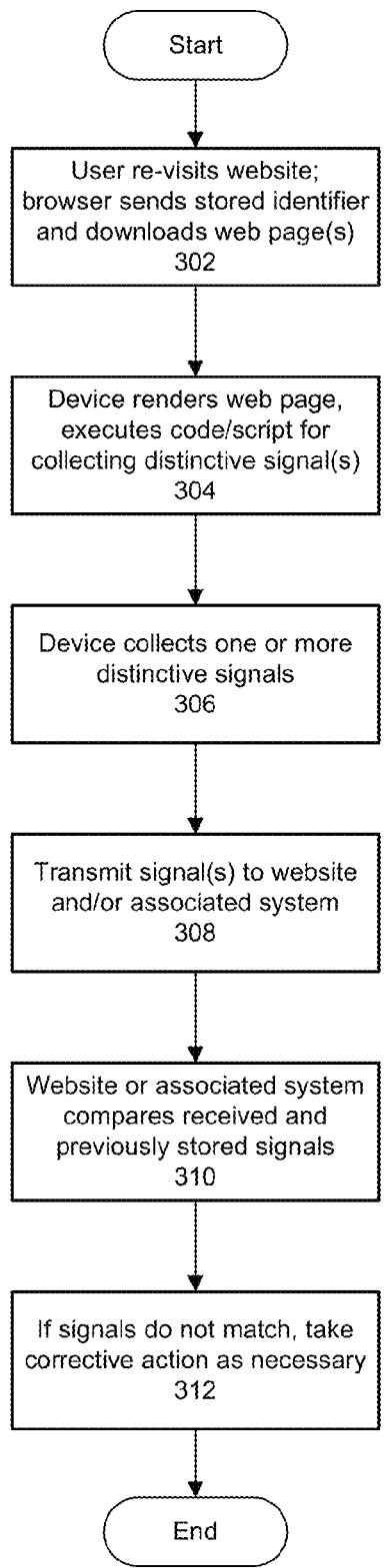
FIG. 3 is a flow chart illustrating a method of authenticating or validating a cookie or other unique identifier using one or more distinctive signals, in accordance with some embodiments.

FIG. 3 is a flow chart illustrating a method of authenticating or validating a cookie using one or more distinctive signals and/or a device to which a cookie or other identifier is issued, according to some embodiments. In other embodiments, one or more of the illustrated operations may be omitted, repeated, and/or performed in a different order. Accordingly, the specific arrangement of steps shown in FIG. 3 should not be construed as limiting the scope of the embodiments.

In operation 302, a user navigates a browser (or similar application) operating on his or her electronic device to a particular website, and the browser downloads components of one or more web pages, such as a home page or a landing page. In these embodiments, operation 302 involves a return visit to the website after previously receiving a cookie from the site, and so the browser proffers that cookie to the website.

In operation 304, the device (e.g., the browser) renders a web page received from the website. Also, the device executes the signal-collection code received with the web page(s), which may be the same code described in conjunction with the method of FIG. 2.

In some embodiments, however, the signals are not captured every time a web page is downloaded that incorporates or that usually incorporates the code or script for collecting signals, meaning that the browser may not always execute the code. Alternatively, a requested web page that is downloaded to the browser may not always include the code or script. For example, the code/script may only be executed or downloaded on a periodic or occasional basis (e.g., once per day or other time period, every $N^{th}$ session with the website, only when the user logs into the website), and/or when some suspicious or sensitive operation or activity is performed or requested (e.g., changing a password, making a purchase, editing a profile).

In operation 306, the device (e.g., the browser) collects the specified signals, which may involve reading from one or more (software and/or hardware) configuration/information files, identifying one or more components of the device and/or drivers for operating the components, determining whether or not the device includes a particular component, determining a time zone set on the device (e.g., as part of the operating system), etc.

As indicated above, the specific signals that are collected may or may not be predetermined. However, the signals that are collected will be used to validate or authenticate the cookie and/or the device; therefore, they will include some or all of the signals collected previously and stored by the website (e.g., as part of the method of FIG. 2).

In operation 308, the collected signal(s) is or are transmitted to the website, or a system that supports the website. In different embodiments, the signals may be transmitted toward the website in the clear, in encrypted form, hashed, as a digest, or in some other form.

In operation 310, the website or an associated system receives the distinctive signals from the device, and compares them to the signals collected when the cookie was previously issued to the device. The signals may be processed in any suitable manner before or during the comparison (e.g., raw, compressed, hashed, encrypted), and may be performed close in time to when the current signals are received, close in time to some activity during the communication session with the device that sent the cookie and the current signals, or at some other time.

In operation 312, if the current/new signals do not match those previously recorded in association with the cookie or the device to which the cookie was issued, action may be taken to prevent attempted activity if the matching was done in real-time or near real-time with the attempt (e.g., changing a user password, changing a profile, sending a message, purchasing something), or if a suspicious situation is detected (e.g., the cookie and new signals were received from an IP (Internet Protocol) different from the address to which the cookie was originally issued).

Or, a mismatch between the current and expected signals may cause a status of the device and/or the associated user to be set to a suspicious or warning level, to indicate that the device may not be the device to which the cookie was originally issued and/or the user may not be the user with whom the cookie was originally associated. In this case, some future activity attempted during the current (or a later) session may be blocked and/or some other corrective or ameliorative action may be taken, such as requiring the user to login, cancelling the cookie, undoing some activity, or performing some other action to authenticate the user and/or device.

In some embodiments, if further authentication or validation action is taken, and the device/user are verified, the previously stored signal(s) (or a stored representation of the previous signal(s), such as a hash) may be expunged and replaced with a newer set of signals.

Figure 4:
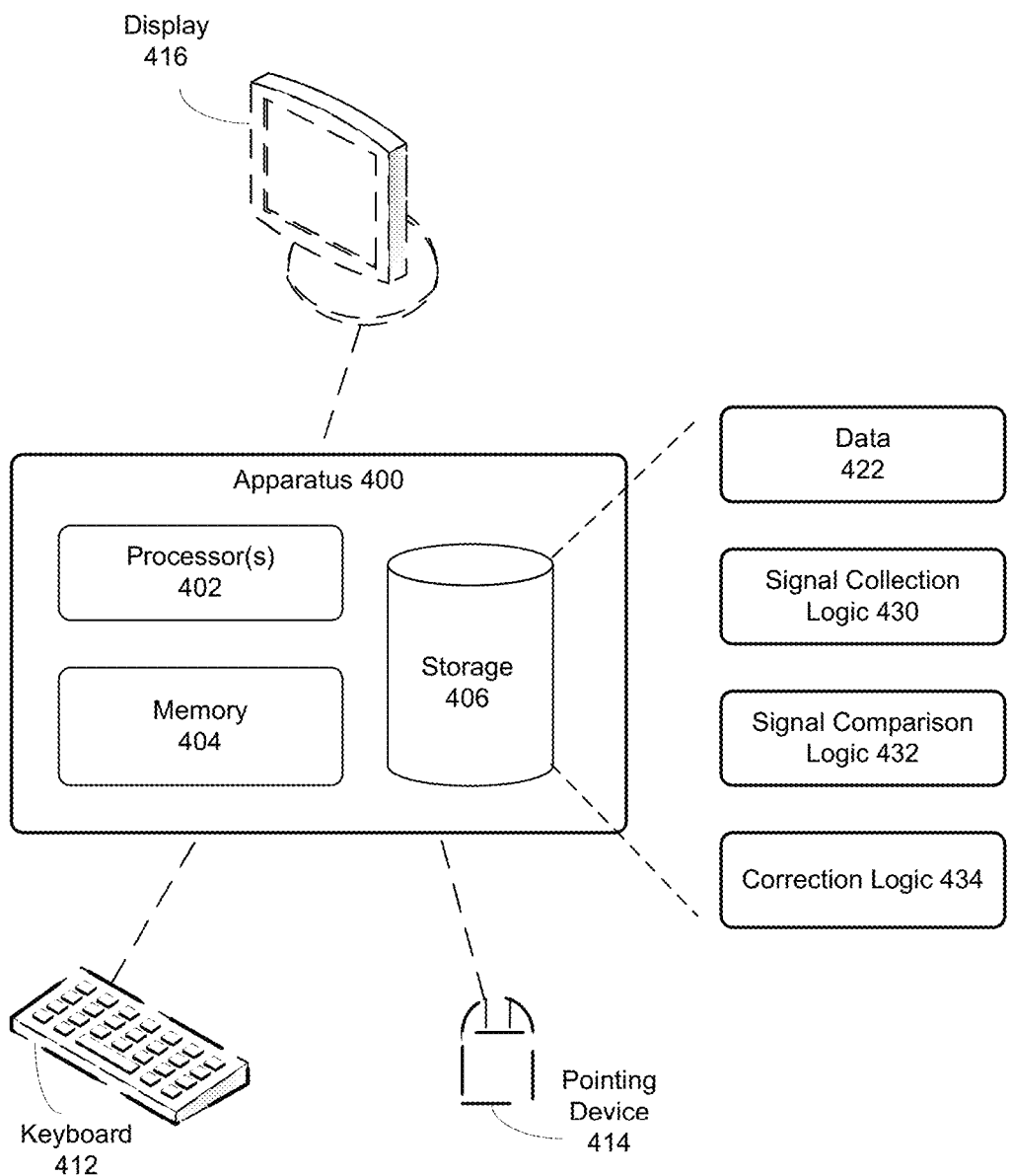
FIG. 4 depicts an apparatus for using distinctive signals regarding a particular computing device to authenticate or validate a cookie or other unique identifier, in accordance with some embodiments.

FIG. 4 is a block diagram of an apparatus for gathering one or more distinctive signals regarding a particular computing device, and/or authenticating or validating a cookie (or other identifier) issued to that device based on those distinctive signals, according to some embodiments.

Apparatus 400 of FIG. 4 includes processor(s) 402, memory 404, and storage 406, which may comprise one or more optical, solid-state, and/or magnetic storage components. Storage 406 may be local to or remote from the apparatus. Apparatus 400 can be coupled (permanently or temporarily) to keyboard 412, pointing device 414, and/or display 416.

Storage 406 stores data 422 used by apparatus 400, including distinctive signals gathered from one or more computing devices (and/or users of those devices) or representations of such signals (e.g., hashes, summaries, checksums). Cookies (or other identifiers) that were issued to the devices and that may be authenticated or validated based on the stored signals may also reside in storage 406, or may be stored elsewhere.

Storage 406 also stores logic and/or logic modules that may be loaded into memory 404 for execution by processor(s) 402, such as signal collection logic 430, signal comparison logic 432, and correction logic 434. In other embodiments, any or all of these logic modules may be aggregated or divided to combine or separate their functionality as desired or as appropriate.

Signal collection logic 430 comprises processor-executable instructions for collecting one or more distinctive signals from a computing device, such as those identified above and/or others. Logic 430 may be embedded in one or more web pages or other objects downloaded to a device, or may be delivered to the device separately. When the web page or other object downloaded to the device is rendered or presented, logic 430 is executed to gather the signals and transmit them (e.g., to apparatus 400 or an associated apparatus).

Signal comparison logic 432 comprises processor-executable instructions for comparing one set of distinctive signals received from a particular electronic device—such as when logic 430 executes during a current communication session—with a previous version of the signals, such as a version of the signals received and saved when a cookie was issued to the device.

Correction logic 434 comprises processor-executable instructions for taking action as necessary and as warranted when logic 432 determines that a newly received set of signals received from a device/user does not match a set of signals previously stored for the same cookie/device/user. Logic 434 may involve blocking an attempted action, changing a status of the device/user (e.g., to mark the device/user as a possible or suspected bad actor), locking a user account, logging activity conducted by the device/user, reversing some action taken during a current communication session, and so on.

Storage 406 may also store other logic, such as communication logic for generating and/or issuing a cookie to a device, receiving a cookie from a device, delivering the code for collecting signals (as part of or separate from content), and/or performing other communication tasks.

In some embodiments, apparatus 400 performs some or all of the functions ascribed to one or more components of system 110 of FIG. 1.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:
1. A method comprising:
  during a first communication session between a first electronic device and a content source:
    issuing an identifier to the first device;

delivering to the first device executable logic for collecting distinctive signals, wherein the logic executes to:
determine a first characteristic of a device on which the logic is executed; and
dynamically select the distinctive signals to collect, based on the first characteristic; and
upon execution of the logic by the first device:
receiving a first set of corresponding distinctive signals from the first device; and
storing the first set of corresponding distinctive signals;
during a second communication session between a second electronic device and the content source, initiated after the first communication session:
receiving the identifier from the second device;
delivering the executable logic to the second device; and
upon execution of the logic by the second device, receiving a second set of corresponding distinctive signals from the second device;
comparing the second set of corresponding distinctive signals to the first set of corresponding distinctive signals; and
responsive to the second set of corresponding distinctive signals not matching the first set of corresponding distinctive signals, blocking or reversing an action initiated during the second communication session.

2. The method of claim 1, wherein the first set and the second set of corresponding distinctive signals each comprise: a time zone set on the corresponding device; and a screen size of the corresponding device.

3. The method of claim 2, wherein the first set and the second set of corresponding distinctive signals each further comprise: a user agent on the corresponding device; and a canvas fingerprint generated on the corresponding device.

4. The method of claim 1, wherein said comparing is performed only after termination of the second communication session.

5. The method of claim 1, wherein said comparing is performed when one of a predetermined set of actions is attempted during the second communication session.

6. The method of claim 5, wherein the predetermined set of actions comprises:
changing a password; and
generating a communication.

7. An apparatus, comprising:
one or more microprocessors; and
memory storing instructions that, when executed by the one or more microprocessors, cause the apparatus to:
during a first communication session between a first electronic device and a content source associated with the apparatus:
issue an identifier to the first device;
deliver to the first device executable logic for collecting distinctive signals,
wherein the logic executes to:
determine a first characteristic of a device on which the logic is executed; and
dynamically select the distinctive signals to collect, based on the first characteristic; and
upon execution of the logic by the first device:
receive a first set of corresponding distinctive signals from the first device; and
store the first set of corresponding distinctive signals;
during a second communication session between a second electronic device and the content source, initiated after the first communication session:
receive the identifier from the second device;
deliver the executable logic to the second device; and
upon execution of the logic by the second device, receive a second set of corresponding distinctive signals from the second device;
compare the second set of corresponding distinctive signals to the first set of corresponding distinctive signals; and
responsive to the second set of corresponding distinctive signals not matching the first set of corresponding distinctive signals, block or reverse an action initiated during the second communication session.

8. The apparatus of claim 7, wherein the first set and the second set of corresponding distinctive signals each comprise: a time zone set on the corresponding device; and a screen size of the corresponding device.

9. The apparatus of claim 8, wherein the first set and the second set of corresponding distinctive signals each further comprise: a user agent on the corresponding device; and a canvas fingerprint generated on the corresponding device.

10. The apparatus of claim 7, wherein said comparing is performed only after termination of the second communication session.

11. The apparatus of claim 7, wherein said comparing is performed when one of a set of predetermined actions is attempted during the second communication session.

12. The apparatus of claim 11, wherein the set of predetermined actions comprises:
changing a password; and
generating a communication.

13. A system, comprising:
one or more microprocessors; and
a communication module comprising a non-transitory computer-readable medium storing instructions that, when executed, cause the system to:
during a first communication session between a first electronic device and a content source associated with the system:
issue an identifier to the first device; and
deliver to the first device executable logic for collecting distinctive signals, wherein the logic executes to:
determine a first characteristic of a device on which the logic is executed; and
dynamically select the distinctive signals to collect, based on the first characteristic; and
during a second communication session between a second electronic device and the content source, initiated after the first communication session:
receive the identifier from the second device; and
deliver the executable logic to the second device;
a signal collection module comprising a non-transitory computer-readable medium storing instructions that, when executed, cause the system to:
during the first communication session, upon execution of the logic by the first device:
receive a first set of corresponding distinctive signals from the first device; and
store the first set of corresponding distinctive signals; and
during the second communication session, upon execution of the logic by the second device:
receive a second set of corresponding distinctive signals from the second device; and
a signal comparison module comprising a non-transitory computer-readable medium storing instructions that, when executed, cause the system to:

compare the second set of corresponding distinctive signals to the first set of corresponding distinctive signals; and responsive to the second set of corresponding distinctive signals not matching the first set of corresponding distinctive signals, block or reverse an action initiated during the second communication session.

14. The system of claim 13, wherein the first set and the second set of corresponding distinctive signals each comprise: a time zone set on the corresponding device; and a screen size of the corresponding device.

15. The system of claim 14, wherein the first set and the second set of corresponding distinctive signals each further comprise: a user agent on the corresponding device; and a canvas fingerprint generated on the corresponding device.

16. The system of claim 13, wherein said comparing is performed only after termination of the second communication session.

17. The system of claim 13, wherein said comparing is performed when one of a predetermined set of actions is attempted during the second communication session.

18. The method of claim 1, further comprising at least one of:
    identifying as bad actors one or both of the second device and a user associated with the second communication session; and
    locking an account of the user associated with the second communication session.

19. The apparatus of claim 7, wherein the memory further stores instructions that, when executed by the one or more microprocessors, cause the apparatus to one or more of:
    identify as bad actors one or both of the second device and a user associated with the second communication session; and
    lock an account of the user associated with the second communication session.

20. The system of claim 13, wherein the non-transitory computer-readable medium of the signal comparison module further comprises instructions that, when executed, cause the system to one or more of:
    identify as bad actors one or both of the second device and a user associated with the second communication session; and
    lock an account of the user associated with the second communication session.

* * * * *